United States Patent Office 3,206,510
Patented Sept. 14, 1965

3,206,510
PROCESS FOR MAKING CYCLOHEXANONE-OXIME
Francis Weiss, Pierre-Benite, and Marcel Thevenon, La Mulatiere, France, assignors to Societe d'Electro-Chimie d'Electro-Metallurgie et des Acieries Electriques d'Ugine, Paris, France, a corporation of France
No Drawing. Filed May 9, 1963, Ser. No. 279,298
Claims priority, application France, May 10, 1962, 897,166
7 Claims. (Cl. 260—566)

This invention relates to a process for making cyclohexanone-oxime by oxidation of cyclohexylamine with hydrogen peroxide, in the presence of soluble salts of tungstic, molybdic or uranic acids.

The oxidation of cyclohexylamine into cyclohexanone-oxime by hydrogen peroxide in the presence of catalysts, preferably soluble tungstic salts, is well known. It is known that to effect the best output of transformation, only about one-half of the cyclohexylamine is oxidized to obtain, as a reaction product, a compound of equimolar addition between amine and oxime. This compound is crystallized at ambient temperature and has a low solubility in water. It is collected by filtration, then divided into its components by distillation, or by treatment with an acid solution to dissolve the amine into a salt.

Although it has been proposed to carry out the reaction at temperatures up to about 100° C., experience has shown it preferable to perform the reaction at a temperature lower than the temperature of crystallization of the addition compound, so as to form this compound in course of performing the reaction and so as to avoid a stronger oxidation of the oxime. Consequently, the range of temperatures available is very narrow and lies between 10° C., a minimum necessary to have a sufficient speed of reaction, and 30° C., a maximum which is the melting point of the crystals of the addition compound. The strong exothermicity of the reaction requires powerful means for dissipation of the calories generated in order to maintain the temperature of the reaction within these narrow limits of temperature next to ambient temperatures.

Another drawback of the process is the necessity for limiting the rate of transformation of the amine, so as to permit an important recycling of the amine after its separation from the oxime.

Finally, during the separation of the addition compound into its components, by distillation in the presence of water vapor, the amine is collected at the top while the oxime, which is less volatile, is extracted from the evaporator of the distillation column. Thus, the oxime is subjected to relatively high temperatures for a rather long time, which is bad for it because of its tendency to provide products of resinification.

We have discovered that if one operates in the presence of dicyclohexylamine, all these drawbacks are avoided. When a mixture of cyclohexylamine and dicyclohexylamine is treated with hydrogen peroxide, in the presence of the catalysts aforementioned:

(1) Cyclohexylamine is preferentially oxidized, dicyclohexylamine remaining sensibly unchanged in the conditions of the reaction until substantially complete transformation of the cyclohexylamine into cyclohexanone-oxime.

(2) There is formation of an addition compound between cyclohexanone-oxime and dicyclohexylamine, preferably to the known addition compound with cyclohexylamine. This occurs even when the dicyclohexylamine is present in molar insufficiency relative to the oxime.

(3) The composition of the addition compound, together with its melting point, is related to the initial ratio dicyclohexylamine/cyclohexylamine. Thus, the melting point, which is also variable with the wetness of the crystals, increases from 35° C. to 65° C. when the initial molar ratio of dicyclohexylamine/cyclohexylamine changes from 0.05 to 0.66.

According to the process of our invention, cyclohexylamine is treated with hydrogen peroxide in an aqueous medium, in the presence of a catalyst and dicyclohexylamine to oxidize cyclohexylamine into cyclohexanone-oxime. Then this cyclohexanone-oxime is separated from the reaction medium as an addition compound with dicyclohexylamine, and pure cyclohexanone-oxime is collected from the addition compound by distillation.

The optimum conditions for performing the reaction are as follows:

(a) The hydrogen peroxide is used in sensibly stoichiometric quantities relating to cyclohexylamine, i.e. 2 moles per mole, according to the formula:

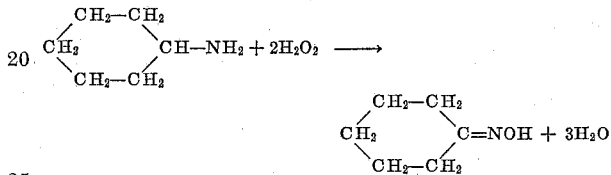

A slight excess of 10–20% of the hydrogen peroxide may be necessary to compensate for the losses by decomposition. However, this decomposition of hydrogen peroxide can be reduced to small amounts by addition of a stabilizing substance to the hydrogen peroxide.

(b) The catalyst, for instance sodium tungstate, is used in amounts of 0.1 to 5 moles percent relative to cyclohexylamine.

(c) The initial molar ratio of dicyclohexylamine to cyclohexylamine is preferably between 0.05:1 and 1:1. However, it is possible to use more dicyclohexylamine without any damage. When the quantity of dicyclohexylamine used is relatively low, sometimes the aqueous phase contains a little dissolved cyclohexanone-oxime, up to about 1% in weight. But it is easy to extract it from these mother-waters by adding a little dicyclohexylamine that gives immediately, with the dissolved oxime, an insoluble addition compound that is separated and added to the principal product of reaction.

(d) The temperature of the reaction is between about 10° C. and about 100° C., preferably between 15° C. and 60° C. According to the temperature and the quantity of dicyclohexylamine chosen, the addition compound will be either in the crystallized state, or in the molten state.

(e) The duration of the reaction varies according to the temperature and the concentration of the catalyst and is between 0.5 and 3 hours.

(f) The reaction is quite easily performed continuously; for instance, in 2 to 4 arranged in series reactors. The addition of the reagents can be done completely in the first reactor or distributed in the successive reactors so as to avoid excessive concentrations.

Production of the pure cyclohexanone-oxime from the obtained addition compound is performed preferably by distillation. In comparison to what happens in the known processes, the cyclohexanone-oxime in our process is the more volatile component, and, consequently, it is collected at the top of a distillation column, and the dicyclohexylamine is extracted from the bottom of the column. Accordingly, the oxime remains at a high temperature for a minimum time and is consequently obtained in the best condition with a high degree of purity, without any other purification required. Traces of dicyclohexylamine that can follow it in case of insufficient fractional distillation can be eliminated by acid washing; but this is not indispensable, for the oxime obtained, that is completely colorless, is suitable without modification for the making of caprolactame, a raw material important for the production of polyamides.

The addition compound obtained according to our process, and whether in crystal or molten state, is so sent into a distillation column operating preferably at reduced pressure, for instance, 10–200 mm. Hg. Under a pressure of 20 mm. Hg, for instance, cyclohexanone-oxime boils at 112° C., while dicyclohexylamine boils at 130° C.

A previous eliminating of the top fractions eliminates easily the little quantities of water, of cyclohexylamine not transformed, or of the by-product, cyclohexanone, whereby none of these is found in the raw product of the reaction.

Dicyclohexylamine is the usual by-product from the manufacture of cyclohexylamine which is obtained either by catalytic reaction of ammonia with cyclohexanol or by reduction of nitrobenzene, aniline, nitrocyclohexane, etc. These raw products can be used without further treatment thereof.

The oxidation of dicyclohexylamine is negligible in the usual conditions of the process, but it can occur partially at the end of the process when, for instance, there remains an excess of hydrogen peroxide which has not been consumed by oxidation of cyclohexylamine. Then there appears essentially one mole of cyclohexanone and one mole of cyclohexanone-oxime, per mole of dicyclohexylamine, that are added to the products of the principal reaction, without disturbing the process.

The process according to the invention presents numerous advantages over the known processes:

(1) Substantially all if not all the cyclohexylamine can be changed into oxime, without a decrease in output, since oxime is not submitted to the oxidizing action of the medium by the formation of the new addition compound;

(2) There is a permanent crystallization of the addition compound in a much wider range of temperature, which makes easier the choice of condition of work and simplifies the problems of thermal exchanges;

(3) The addition compound remains insoluble in the medium when the temperature thereof is raised above the melting point of the addition compound. Reciprocally, when oxime is formed, under the conditions of our process at a temperature superior to the temperature of crystallization of the addition compound, it is nevertheless extracted immediately from the aqueous medium and passes into the layer of insoluble dicyclohexylamine. The part played by the formation of crystals may consequently be played in our process by the separation of a non-miscible liquid layer, which is an advantage important from a technologic point of view, for one can simply decant instead of filtering crystals. Accordingly, we can operate at a sufficient temperature to have a molten phase, or simply raise temperature at the end of the reaction so as to obtain a liquid layer that will be separated by decantation. Such a way of practicing our process permits continuous operations.

With only cyclohexylamine, such a process of operation is not possible, for this amine is miscible with water so that when one raises the temperature above the melting point, there is a dissociation of the addition compound with dissolution of a part of the amine.

Another advantage of the recuperation in the molten state is that the product of the reaction is obtained sensibly anhydrous while the crystals, generally very fine, keep important quantities of mother-waters, the result of which is, moreover, to complicate the recuperation of the costly catalyst which is dissolved in them.

The following non-restrictive examples show our process:

Example 1

Into a one-liter bulb, provided with a mechanical stirrer, is placed a solution of 0.02 mole of neuter sodium tungstate and 1 g. of di-soda salt of ethylene diamine tetracetic acid and 300 m.$^3$ of water and 50 cm.$^3$ of methanol. Next, we introduce progressively, on the one hand, 226 g. of hydrogen peroxide at 30% (2 moles), and, on the other hand, a mixture of 99 g. of cyclohexylamine (1 mole) and a variable quantity (see following table) of dicyclohexylamine. The temperature is maintained between 15° C. and 18° C. during addition, which lasted for about 1 hour, then the reaction was continued for another hour at the same temperature. Thereafter, we filter the crystals that have been washed on a filter with 50 to 100 cc. of water. The results obtained are set forth in the following table:

| Experiment No. | Molar ratio dicyclohexylamine/cyclohexylamine | Addition product "cyclohexanone-oxime-dicyclohexylamine" in g. (wet raw product) | (° C.) Melting point of crystals (wet) | Rate of transformation of cyclohexylamine,[1] percent | Output in oxime [2] Relative to amine, percent | Output in oxime [2] Relative to $H_2O_2$, percent |
|---|---|---|---|---|---|---|
| a | 0.05 | 137 | 35–38 | 94.6 | 94.5 | 89.3 |
| b | 0.10 | 156 | 37–43 | 96.0 | 96.6 | 92.8 |
| c | 0.15 | 160 | 39–42 | 94.1 | 96.0 | 90.5 |
| d | 0.33 | 206 | 41–44 | 94.6 | 98.0 | 92.8 |
| e [3] | 0.66 | 290 | 60–65 | 97.8 | 98.5 | 96.3 |

[1] The total rate of transformation of cyclohexylamine is expressed by $$TT = 100 \times \frac{\text{initial amine-recuperated amine}}{\text{initial amine}}$$

[2] Molar output in percent of the transformed cyclohexylamine, on the one hand, of introduced hydrogen peroxide, on the other hand.

[3] Experiment made with 1.200 cc. of water and 180 cc. of methanol, the other conditions being unchanged.

Example 2

Experiment d of Example 1 was repeated, but the temperature was maintained at 30° C. Also, the addition was performed in 40 minutes and the total duration of the experiment was 1½ hours. The results obtained were very similar to those realized before:

Total rate of transformation was 95.2%.

Output 97.8% relative to amine and 93% relative to hydrogen peroxide.

Example 3

Experiment d of Example 1 was repeated, but the methanol was suppressed. The rate of transformation was 95.2%, and the output relative to amine was 97%.

Example 4

Experiment d of Example 1 was repeated, at a temperature of 50° C., so as to have a molten addition product. At the end of the reaction, we decanted in the hot state and obtained 160 g. of the addition product which solidified when cooling. By cooling the decanted aqueous part, 3 g.

of crystallized addition product were again precipitated and were added to the principal product.

The whole of the addition compound so obtained was submitted to a fractional distillation under 20 mm. Hg. We obtained, after eliminating a small top fraction, 97 g. of colorless cyclohexanone-oxime melting at 86–88° C. At the bottom, we recovered 57 g. of dicyclohexylamine, i.e., about 95% of the quantity used.

The output of oxime was over 96% of the cyclohexylamine transformed.

We claim:

1. In a process for making cyclohexanone-oxime by oxidizing cyclohexylamine with hydrogen peroxide in the presence of a catalyst selected from the group consisting of a salt of an acid of a metal of tungsten, molybdenum and uranium, the improvement comprising carrying out said oxidizing with an amount of hydrogen peroxide of at least two moles per mole of cyclohexylamine in the presence of dicyclohexylamine at a temperature between about 10° C. and about 100° C. to obtain an addition compound of cyclohexanone-oxime and dicyclohexylamine, said dicyclohexylamine being substantially unchanged until substantially complete formation of cyclohexanone-oxime from cyclohexylamine, the molar ratio of dicyclohexylamine to cyclohexylamine being at least 0.05:1, recovering said addition compound from the reaction medium and separating said cyclohexanone-oxime from said addition compound.

2. The improvement of claim 1 wherein said oxidizing is carried out at a temperature between about 10° C. and about 60° C.

3. The improvement of claim 1 wherein said addition compound is recovered from said reaction medium in the form of crystals by filtering.

4. The improvement of claim 1 wherein said addition compound is recovered from said reaction medium in a molten state by decanting.

5. The improvement of claim 1 wherein said cyclohexanone-oxime is separated from said addition compound by distillation in which said cyclohexanone-oxime is the distillate.

6. The improvement of claim 1 wherein said addition compound is recovered from said reaction medium in the form of crystals by filtering and wherein said cyclohexanone-oxime is separated from said addition compound by distillation in which said cyclohexanone-oxime is the distillate.

7. The improvement of claim 1 wherein said addition compound is recovered from said reaction medium in a molten state by decanting and wherein said cyclohexanone-oxime is separated from said addition compound by distillation in which said cyclohexanone-oxime is the distillate.

References Cited by the Examiner

UNITED STATES PATENTS 2,706,204　4/55　Kahr ---------------- 260—566

FOREIGN PATENTS 1,002,333　2/57　Germany.

OTHER REFERENCES

Lebedue et al.: Zhur. Obshehie. Khim., vol. 30, pages 1631–1635 (1960); C.A., vol. 55, page 1473 (1961).

CHARLES B. PARKER, *Primary Examiner.*